United States Patent [19]

Kawabata et al.

[11] Patent Number: 5,623,178
[45] Date of Patent: Apr. 22, 1997

[54] COIL STRUCTURE FOR ELECTRIC MOTOR

[75] Inventors: Yasutomo Kawabata, Aichi-ken; Eiji Yamada, Owariasahi; Tetsuya Miura, Toyota, all of Japan

[73] Assignee: Toyota Jidosha Kabushiki Kaisha, Toyota, Japan

[21] Appl. No.: 266,869

[22] Filed: Jul. 5, 1994

[30] Foreign Application Priority Data

Jul. 19, 1993 [JP] Japan ................... 5-178331

[51] Int. Cl.⁶ ................... H02K 3/28; H02K 3/46; H02K 3/50
[52] U.S. Cl. ................... 310/260; 310/71
[58] Field of Search ................... 310/43, 179, 71, 310/201, 208, 260

[56] References Cited

U.S. PATENT DOCUMENTS

| | | | |
|---|---|---|---|
| 251,537 | 12/1881 | Edison | 310/201 |
| 753,278 | 3/1904 | Lindeman | 310/201 |
| 2,085,099 | 6/1937 | Jones | 310/208 |
| 2,929,943 | 3/1960 | Richardson et al. | 310/64 |
| 3,145,317 | 8/1964 | Blohm et al. | 310/260 |
| 3,151,260 | 9/1964 | MacCracken, Jr. et al. | 310/43 |
| 3,176,176 | 3/1965 | Willyoung | 310/208 |
| 3,675,058 | 7/1972 | Beddows et al. | 310/71 |
| 4,028,572 | 6/1977 | Baltisberger | 310/201 |
| 4,056,880 | 11/1977 | Stewart | 310/71 |
| 4,321,497 | 3/1982 | Long | 310/198 |
| 4,543,503 | 9/1985 | Kaminski | 310/59 |
| 4,633,115 | 12/1986 | Saitoh et al. | 310/71 |
| 5,196,752 | 3/1993 | Palma | 310/260 |
| 5,270,598 | 12/1993 | Holly, III et al. | 310/71 |
| 5,332,939 | 7/1994 | Fanning et al. | 310/71 |
| 5,422,526 | 6/1995 | Kawabata et al. | 310/210 |

FOREIGN PATENT DOCUMENTS

| | | |
|---|---|---|
| 56-118578 | 9/1981 | Japan . |
| 58-41031 | 3/1983 | Japan . |
| 62-48167 | 3/1987 | Japan . |
| 6-209535 | 7/1994 | Japan . |

*Primary Examiner*—Clayton E. LaBalle
*Attorney, Agent, or Firm*—Kenyon & Kenyon

[57] ABSTRACT

Molded coil pieces inserted into a slot are separately connected to molded coil pieces belonging to another slot of the same phase as the former coil pieces by a connecting member. The connecting member has conductive members laminated in a direction perpendicular to a rotating shaft of the rotor in the motor via insulating layers, and the molded coil pieces are separately connected to each other by these conductive members, whereby the protrusion of a coil end from each slot can be reduced, which permits the miniaturization and the weight reduction of the motor. Furthermore, the dimensional accuracy of the connecting members can be improved by a simple constitution and manufacturing process, whereby the characteristics of the electric motor can be remarkably improved.

11 Claims, 11 Drawing Sheets

COIL STRUCTURE FOR ELECTRIC MOTOR

BACKGROUND OF THE INVENTION

1. Field of the Invention

The present invention relates to a structure of a coil for an electric motor, and more specifically, it relates to a coil structure for an electric motor which can reduce the unevenness of an electric constant to improve output and can decrease the protrusion of a coil end in a rotating shaft direction of the electric motor.

2. Description of the Prior Art

FIG. 1 shows a partial coil structure on the edge surface of a stator of an electric motor in accordance with a conventional embodiment.

The electric motor regarding this conventional embodiment is a three-phase motor which is constituted of a stator 24, and a rotor 27 arranged so as to confront the stator 24. The stator 24 is composed of a stator core 24a provided with a predetermined number of slots 30 facing the rotor 27, and coils 11U, 11V and 11W of the respective phases inserted into the slots 30.

Each of the coils 11U, 11V and 11W has a bundle structure of a plurality of lead wires, and these coils are wound through the slots 30 corresponding to the respective coils. In this connection, of each coil 11U, 11V or 11W, a part (a coil end) which is wound, being protruded from the edge surface of the stator core 24a, i.e., the edge of each slot 30, will hereinafter be called a crossover coil between the slots.

In FIG. 1, the stator 24 and the rotor 27 are depicted in a straight line, but in fact, the stator 24 and the rotor 27 are cylindrical. In a cylindrical space defined inside the stator 24, the rotor 27 is arranged so as to confront the stator 24, as described above. On the surface of the rotor 27 which confronts the stator core 24a, permanent magnets 26 are mounted. Therefore, when a predetermined AC driving current is fed to the coils 11U, 11V and 11W, a three-phase alternating field is generated in the stator 24 to generate torque on the rotor 27.

Such a coil structure has a problem that the so-called space factor of the coil (a ratio of a volume occupied by the coil in the slot to the total slot volume) decreases inconveniently.

That is, the constitution where the coil comprising the bundle of a plurality of lead wires is wound through the slots permits the assembly of the electric motor with a suitable workability. However, the space factor of the coil in each slot is low, for example, 50%, and in consequence, the miniaturization of the electric motor has been restricted. Furthermore, when the coil is constituted by bundling the plurality of lead wires, the size of the crossover coil increases, and also for this reason, the miniaturization of the electric motor is difficult. Moreover, when the lead wires are wound by hand, there is a problem that the unevenness of inductance disadvantageously occurs.

In order to solve the above-mentioned problems, the same applicant as in the present application has suggested in Japanese Patent Application No. 1227/1993 that portions (coil sides) of the coil to be inserted into the slots and coil ends arranged on the edge surface of the stator core be made of different parts and that these parts constitute one coil.

This constitution will be described with reference to FIG. 2.

In FIG. 2, a coil 10 is constituted of a plurality of molded coil pieces 20d (coil sides) which are molded into a bar shape so as to be inserted into the respective slots 30, and a pair of curved crossover coils 13, 13' having the bar shape. The molded coil pieces 20d are laminated and received in the corresponding slots 30. In this case, a lamination direction is the radial direction of the electric motor.

The plurality of crossover rolls 13, 13' between the slots 30 are arranged so as to be mutually separated at a predetermined interval in the radial direction of the electric motor, and they are connected with the edge surfaces of the corresponding molded coil pieces 20d. A space between each pair of crossover coils 13 and 13' of one phase is such a space as to receive each of the crossover coils 13 and 13' of the other phase. The surfaces of the molded coil pieces 20d and the crossover coils 13, 13' are insulated except at contact surfaces between the molded coil pieces 20d and the crossover coils 13, 13'. In FIG. 2, the stator 24 and the rotor 27 are depicted in a straight line for simplification, as in FIG. 1, but in fact, they are cylindrical.

In the constitution in FIG. 2 described above, the space factor of the coil in the slot is improved, but since the crossover coils 13, 13' are molded into the bar shape, these crossover coils 13, 13' are heavy and have a large unevenness of size. This size unevenness leads to uneven inductance, which causes the performance of the electric motor to deteriorate.

Furthermore, the surfaces of the crossover coils 13, 13' are very thinly insulated except at the contact surfaces with the molded coil pieces 20d, and thus an insulation reliability on the crossover portions between the slots 30 is low.

SUMMARY OF THE INVENTION

The present invention has been attained in order to solve these problems, and an object of the present invention is to realize a high space factor of a coil in each slot and to decrease the protrusion of coil ends from slot edges, thereby making it possible to shorten the length of an electric motor and to reduce the weight of the motor.

Another object of the present invention is to improve the dimensional accuracy of connecting members and to enhance an insulation reliability in crossover portions (coil ends) between the slots of the coil by a simple structure and manufacturing process, thereby providing an electric motor having extremely good characteristics.

In order to achieve the above-mentioned objects, the electric motor of the present invention has the following constitution.

That is, the present invention is directed to an N-phase (N=a natural number) driving electric motor having a stator, and a rotor arranged so as to confront the stator.

Said stator has:

(a) a stator core provided with a plurality of slots facing toward the rotor in a direction parallel with a rotating shaft of the rotor, and (b) a coil comprising (b-1) L (L=a natural number) molded coil pieces inserted into each slot, and (b-2) connecting members for connecting the L molded coil pieces in the slot to the L molded coil pieces in another slot having the same phase as the former coil pieces, said connecting members being arranged on two edges of the stator in the direction parallel with the rotating shaft of the rotor, and comprising conductive members laminated via insulating layers in the direction perpendicular to the rotating shaft.

Furthermore, the connecting member has a plurality of conductive pipes, and into each conductive pipe, one molded coil piece can be inserted. In this case, the inserted molded coil piece is electrically connected to the conductive pipe corresponding to the molded coil piece, but the conductive pipe is insulated from another conductive pipe corresponding to another molded coil piece.

The molded coil piece is electrically connected to the conductive pipe by soldering or welding. Furthermore, at least the end section of the molded coil piece which is inserted into the conductive pipe is hollow.

As has just been described, the molded coil piece has the hollow portion in at least its end section to be inserted into the conductive pipe, and a caulking member may be inserted into the hollow end section to electrically connect the molded coil piece to the conductive pipe.

When the connecting members for electrically connecting the molded coil pieces of the same phase to each other are constituted of an outer connecting member arranged on the outer periphery side in the radial direction of the motor and an inner connecting member arranged on the inner periphery side in the radial direction of the motor, the inner connecting member and the outer connecting member are arranged at mutually different heights on the edge of the stator in a direction parallel with the rotating shaft of the rotor.

In the case where the electric motor is an N-phase M-pole motor (N and M=natural numbers) and if a value of N×M/2 is an even number, the outer connecting members and the inner connecting members for connecting the molded coil pieces of the same phase to each other are determined so as to be equal to each other in number.

Furthermore, the above-mentioned connecting member arranged on one edge side of two edges of the stator has L×2 conductive members laminated via insulating layers in a direction perpendicular to the rotating shaft of the rotor, and the above-mentioned connecting member arranged on the other edge side has L×2+1 conductive members laminated. The above-mentioned molded coil pieces constituting the coils of the respective phases may be electrically connected to each other by these conductive members.

As described above, in the electric motor based on the present invention, a predetermined number of the molded coil pieces inserted into each slot are separately connected to the molded coil pieces belonging to the other slot of the same phase via the insulating layers in the connecting member (the crossover coil) by the conductive members laminated in the direction parallel with the rotating shaft of the rotor.

Therefore, the coil of each phase can be constituted without bundling a plurality of conductors. In consequence, the unevenness of inductance and the fluctuation of torque decrease, thereby improving the efficiency of the electric motor, whereby the length of the motor in the rotating shaft direction of the rotor can be shortened.

According to the constitution of the present invention, each molded coil piece is inserted into the conductive pipe of the connecting member to achieve the electrical connection, thereby constituting one coil. Therefore, workability at the time of manufacture is good. In addition, play in a space in each slot, which is generated when forming the coil of each phase by bundling the plurality of conductors, can be reduced to improve the space factor of the coil.

DESCRIPTION OF THE PREFERRED EMBODIMENTS

Now, the present invention will be described in detail with reference to embodiments in accordance with attached drawings. The scope of the present invention should not be limited to these embodiments.

Embodiment 1

Figure 1:
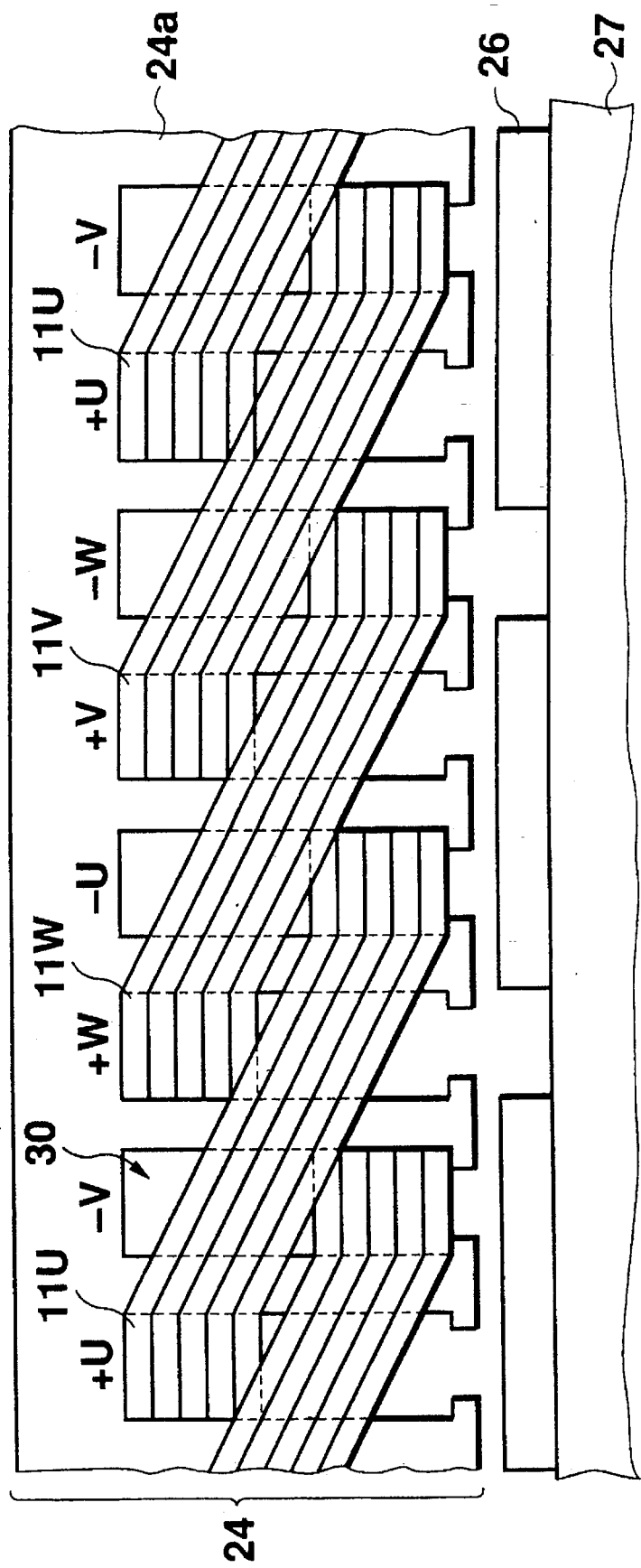
FIG. 1 shows a partial coil structure on the edge surface of a stator in an electric motor according to a conventional embodiment.
Figure 2:
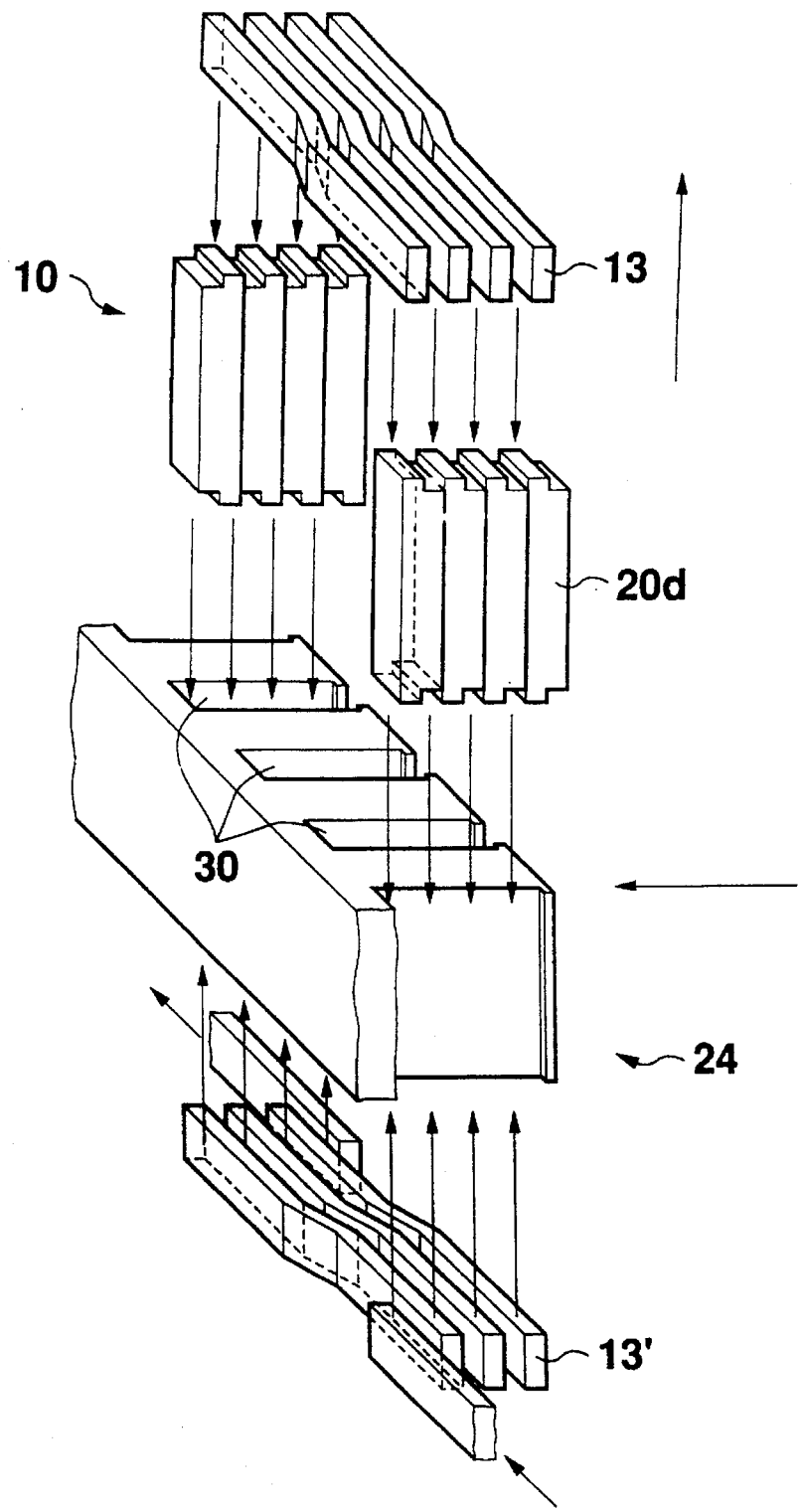
FIG. 2 shows a structure of a coil of one phase in an electric motor according to a related art.
Figure 3:
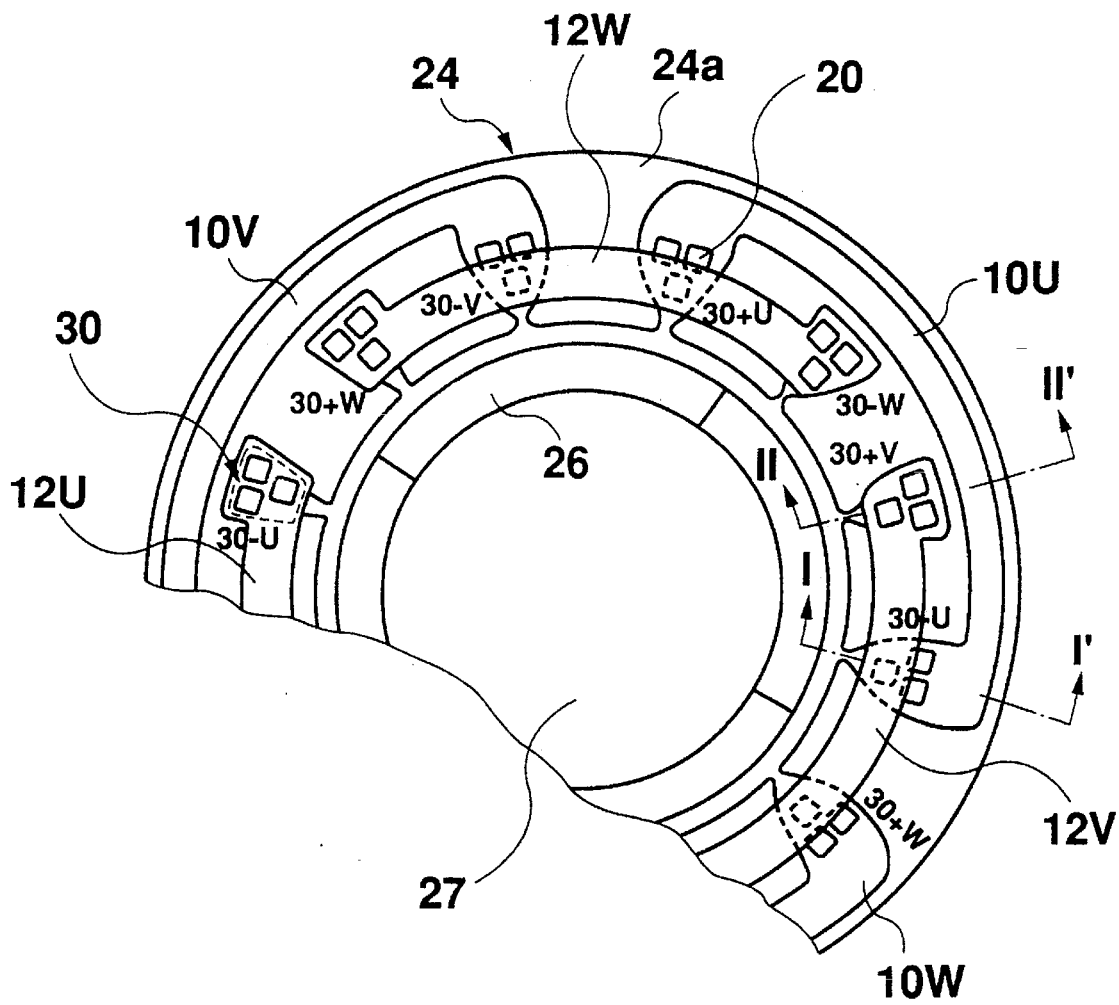
FIG. 3 is an illustrative view of an end portion of an electric motor according to Embodiment 1 of the present invention as seen along a rotating shaft direction.
Figure 4:
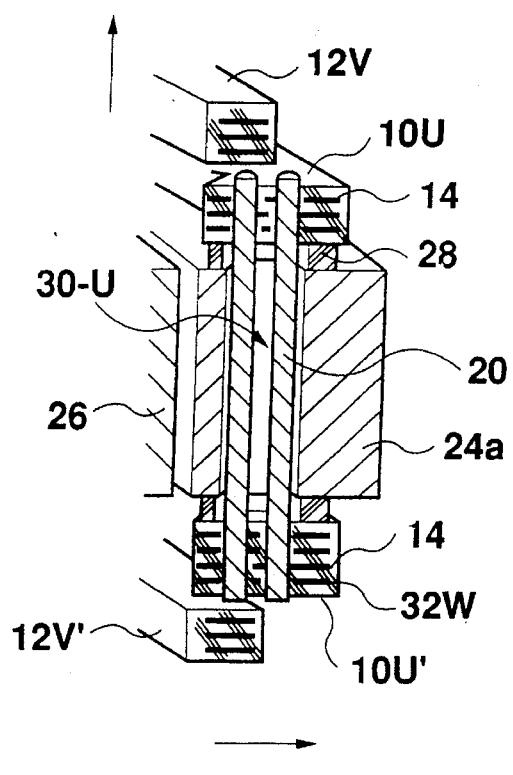
FIG. 4 is a sectional view cut along the line I–I' in FIG. 3.
Figure 5:
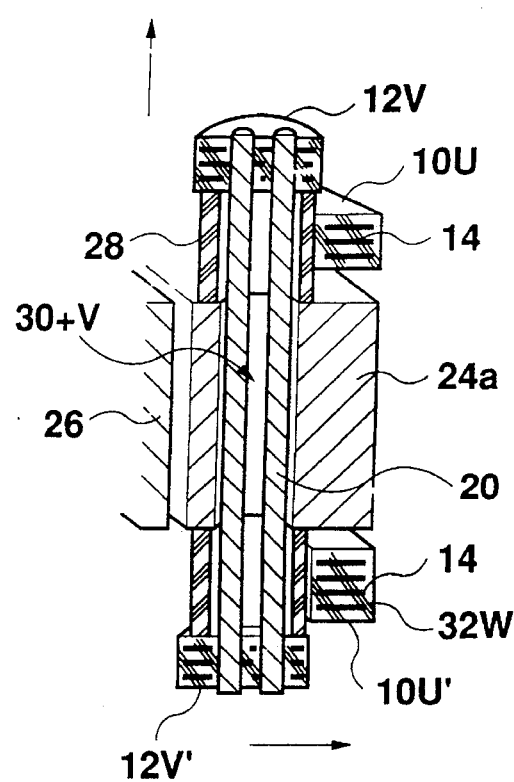
FIG. 5 is a sectional view cut along the line II–II' in FIG. 3.
Figure 6:
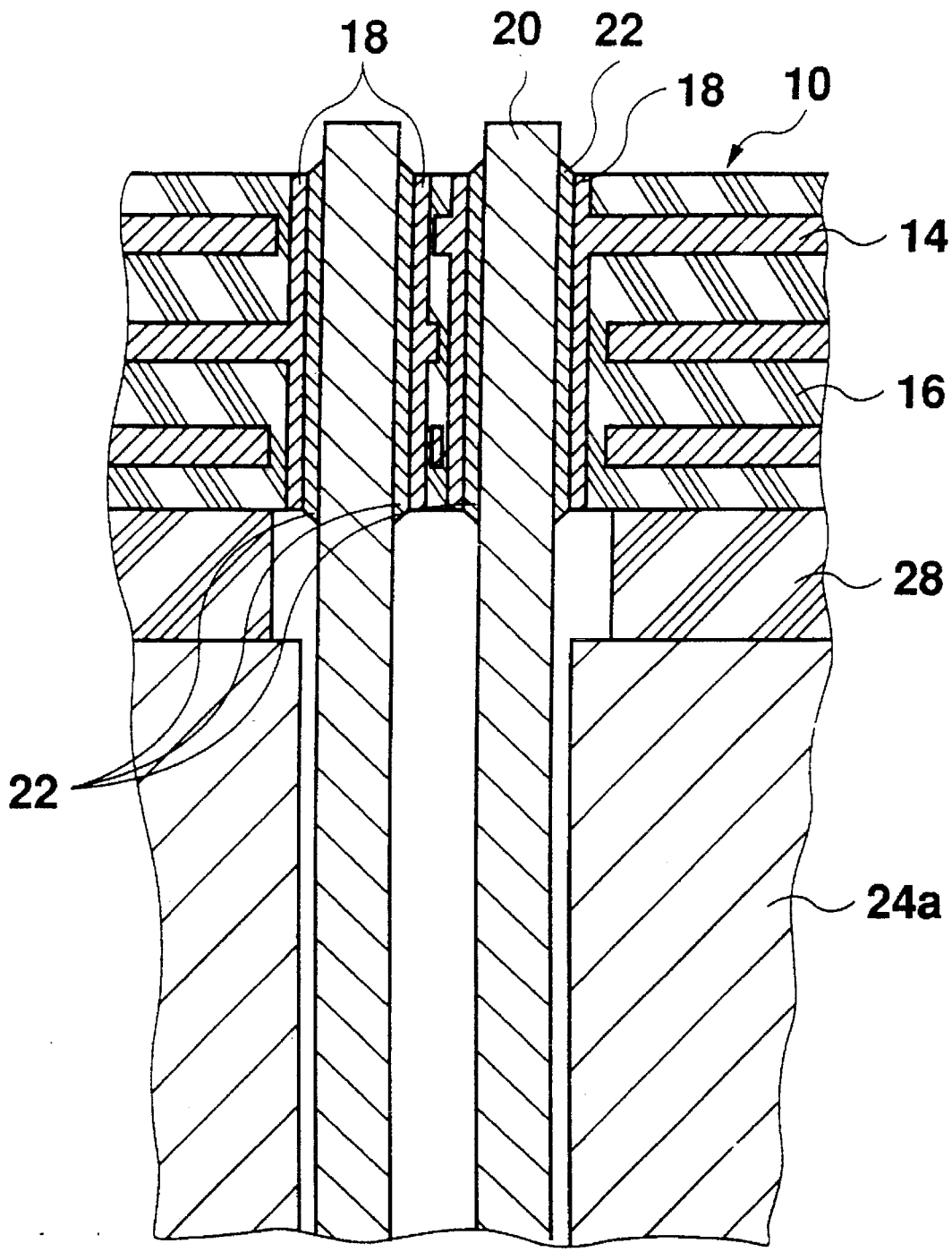
FIG. 6 is an enlarged view of a joint portion of a molded coil piece and a connecting member according to the embodiment of the present invention.

FIG. 3 is an illustrative view of an end portion of a three-phase driving electric motor according to the embodiment of the present invention, as seen from a rotating shaft direction. FIG. 4 is a sectional view cut along the line I–I' in FIG. 3, FIG. 5 is a sectional view cut along the line II–II' in FIG. 3, and FIG. 6 is an enlarged view of a joint portion between a molded coil piece and a connecting member (a crossover coil). The same members as in FIGS. 1 and 2 are represented by the same symbols as in these drawings, and their description will be omitted.

A stator 24 comprises a stator core 24a which has a lamination structure and which is provided with a predetermined number of slots 30 facing toward a rotor 27, and coils 11U, 11V and 11W of the respective phases inserted into the slots 30.

Into the slots 30, molded coil pieces 20 constituting the coils 11U, 11V and 11W of the respective phases are inserted.

Furthermore, on the surface of the rotor 27 which faces toward the stator core 24a, four permanent magnets 26 are mounted, thereby constituting a four-pole electric motor. This drawing shows an example where the three molded coil pieces 20 are inserted into one slot 30, but the number of molded coil pieces is not limited thereto. Alternatively, the molded coil pieces 20 may be formed into a plate shape and may be incorporated so as to be laminated in the radial direction of the electric motor, as shown in FIG. 2.

The electric motor in this embodiment can be driven by a three-phase driving current of U, V and W phases which shift from each other every 120°.

In the U phase, U-phase outer crossover coils 10U, 10U' are arranged at the edge portion of the stator core 24a (the edge portions of the slots 30) and on an outer periphery side in the radial direction of the electric motor. By these U-phase outer crossover coils 10U, 10U', the molded coil pieces 20 in the slots 30+U and 30−U are connected to each other to constitute one U-phase coil. Furthermore, the molded coil pieces 20 in the slots 30+U and 30−U are connected to each other by U-phase inner crossover coils 12U, 12U' arranged on an inner periphery side in the radial direction of the electric motor to constitute another U-phase coil.

On the other hand, as in the U-phase, also in the V-phase and W-phase, corresponding molded coil pieces 20 are connected to each other by a V-phase outer crossover coil 10V and a V-phase inner crossover coil 12V as well as a W-phase outer crossover coil 10W and a W-phase inner crossover coil 12W to constitute two V-phase coils and two W-phase coils.

The outer crossover coil 10V and the inner crossover coil of each phase are arranged, being shifted in the radial direction of the electric motor and the rotating shaft direction of the rotor, as shown in FIGS. 4 and 5.

That is, as shown in FIG. 4, in the U-phase slot portion, the U-phase outer crossover coils 10U, 10U' are located at a low position on the edge of the stator core 24a on the outer periphery side in the radial direction and in a direction parallel with the rotating shaft of the rotor by an insulating spacer 28. On the contrary, the V-phase inner crossover coils 12V, 12V' for connecting the molded coil pieces (not shown) of the V-phase are located at a high position on the edge of the stator core 24a on the inner periphery side in the radial direction and in a direction parallel with the rotating shaft of the rotor by an insulating spacer 28 so as to intersect as little as possible with the U-phase outer crossover coil 10U.

Furthermore, as shown in FIG. 5, in the V-phase slot portion, the U-phase outer crossover coils 10U, 10U' are located at a low position on the edge of the stator core 24a on the outer periphery side in the radial direction of the electric motor and in a direction parallel with the rotating shaft of the rotor by the insulating spacer 28. Also, the V-phase inner crossover coils 12V, 12V' for connecting the molded coil pieces (not shown) of the V-phase are located at a high position on the edge of the stator core 24a on the inner periphery side in the radial direction of the electric motor and in a direction parallel with the rotating shaft by the insulating spacer 28 so as to intersect as little as possible with the U-phase outer crossover coil 10U.

In order not to bring about the unevenness of a motor constant, such as inductance among the respective phases, the number of the outer crossover coils is determined to be equal to that of the inner crossover coils provided in the respective phases, and these coils are uniformly arranged on the edge of the stator core 24a.

In this embodiment, the three-phase four-pole electric motor is exemplarily shown, but in the case of an N-phase M-pole motor (N and M=natural numbers and $\geq 1$), if a value of N×M/2 is an even number, the number of the outer crossover coils in each phase is not different from that of the outer crossover coils, so that the unbalance of the motor constant between the respective phases can be controlled and the loss of current can be reduced.

Each of the outer crossover coils and the inner crossover coils constituting the crossover coils comprises an alternate laminate of conductive members 14 and insulating layers 16 whose number corresponds to that of the molded coil pieces 20 inserted into the respective slots 30. The conductive members 14 correspond to the respective molded coil pieces 20 between the slots 30 of one phase (slots 30+U, 30−U in the case of the U-phase, slots 30+V, 30−V in the case of the V-phase and slots 30+W, 30−W in the case of the W-phase), and they separately connect these molded coil pieces 20 to each other. In this embodiment, the number of molded oil pieces 20 per slot is three, and therefore the conductive members 14 are also formed in three layers via the insulating layers.

In the crossover coils of this embodiment, the conductive layer is further provided in the form of another layer for connecting two coils of the same phase.

For example, in the case of the W-phase, the two coils of the W-phase, that is, in order to connect the coil regarding the W-phase inner crossover coil 12W to the coil regarding the W-phase outer crossover coil 10W, one of the molded coil pieces in a slot 30−W of the W-phase in FIG. 3 is connected to one of the molded coil pieces 20 in the slot 30+W of the W-phase by a conductive member 32W shown in FIGS. 4 and 5. Similarly in the U-phase and the V-phase which are not shown, a plurality of coils of the U-phase and the V-phase are connected to each other by conductive members 32U and 32V.

The joint portion of the crossover coil and the molded coil piece is constituted, as enlargedly shown in FIG. 6. The crossover coil 10 is provided with a conductive pipe 18 into which the molded coil piece 20 can be inserted at a ratio of 1:1. This conductive pipe 18 is connected to one conductive member 14 corresponding to one molded coil piece 20 which is inserted into the conductive pipe 18, and this one conductive member 14 is insulated from the other conductive member 14 corresponding to the other molded coil piece 20 by the insulating layer 16. Therefore, the two molded coil pieces 20 shown in the drawing are connected to the different layers of the conductive members 14, respectively.

After the molded coil piece 20 has been inserted into the conductive pipe 18, the conductive pipe 18 and the molded coil piece 20 are electrically connected to each other by forcing a soldering member 22 into a space therebetween.

As in a conventional technique, the dimensional accuracy of the crossover coil having a bar shape which has been manufactured by molding is in the order of mm units. On the contrary, the crossover coils (the connecting members) of this embodiment are manufactured by a process which comprises laminating or applying the conductive members via the insulating layers in a direction perpendicular to the rotating shaft of the rotor, and therefore a manufacturing technique for accurate printed-wiring boards and the like is applicable. In consequence, the dimensional accuracy of the crossover coils is so high as to be on the order of μm units.

Therefore, according to this embodiment, it is possible to miniaturize a coil end with a simple constitution and to further reduce the unevenness of the inductance of the electric motor. Furthermore, between the conductive members in the connecting members for connecting the respective molded coil pieces to each other, the insulating layers are formed to insulate these conductive members by the accurate lamination technique, and therefore insulation properties between the conductive members are also good.

Figure 7:
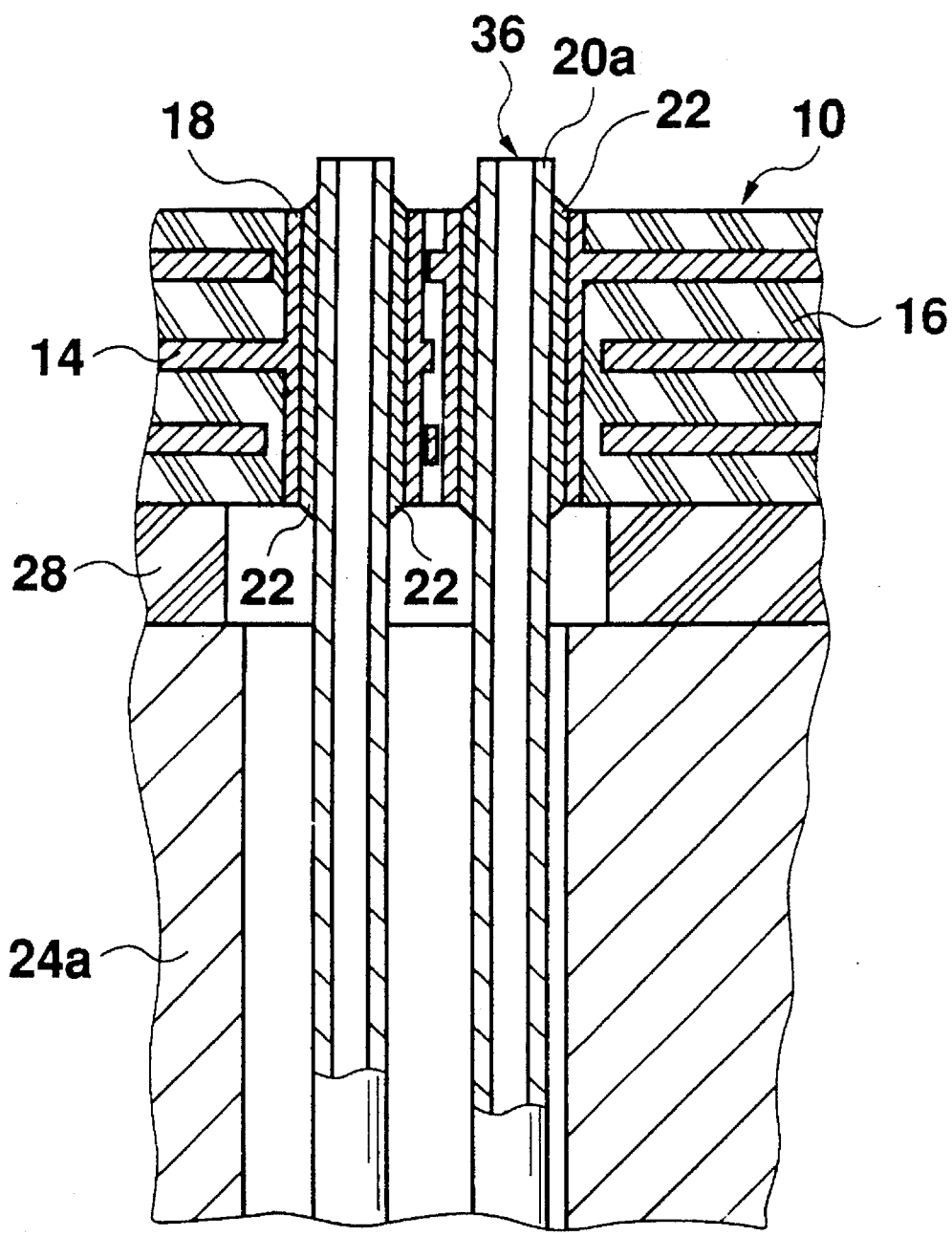
FIG. 7 shows a structure of the molded coil piece according to the embodiment of the present invention.
Figure 8:
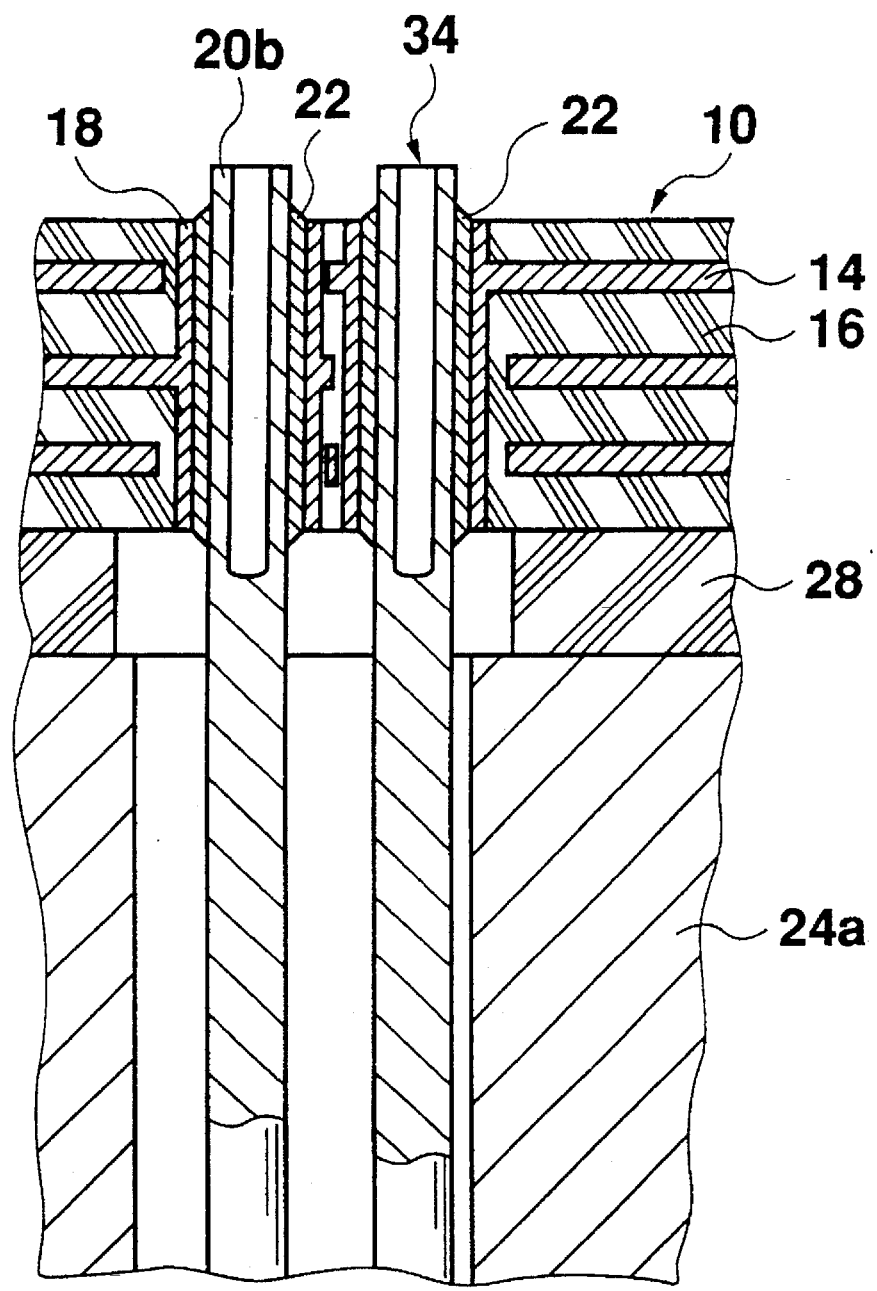
FIG. 8 shows a structure of the molded coil piece which is different from that of FIG. 7.

In order to further improve the electrical connection by the soldering member 22, the molded coil piece 20 is preferably constituted as shown in FIGS. 7 and 8.

The molded coil piece 20 shown in FIG. 6 has a large heat capacity, and so the quality acquisition of the soldering is somewhat poor. On the contrary, the molded coil piece 20a shown in FIG. 7 comprises a hollow pipe provided with a hollow 36 all over. Furthermore, the molded coil piece 20b shown in FIG. 8 is hollow but it is provided with a hollow 34 only in its end portion which is inserted into the crossover coil 10.

If the end portion of the molded coil piece which is inserted into the conductive pipe 18 and then at least soldered is constituted so as to be hollow, its heat capacity can be reduced, so that soldering with stable quality is possible in a relatively short period of time. In addition, the amount of material required for the molded coil pieces can be decreased, whereby the weight of the electric motor can be reduced and material cost can be decreased.

Figure 9:
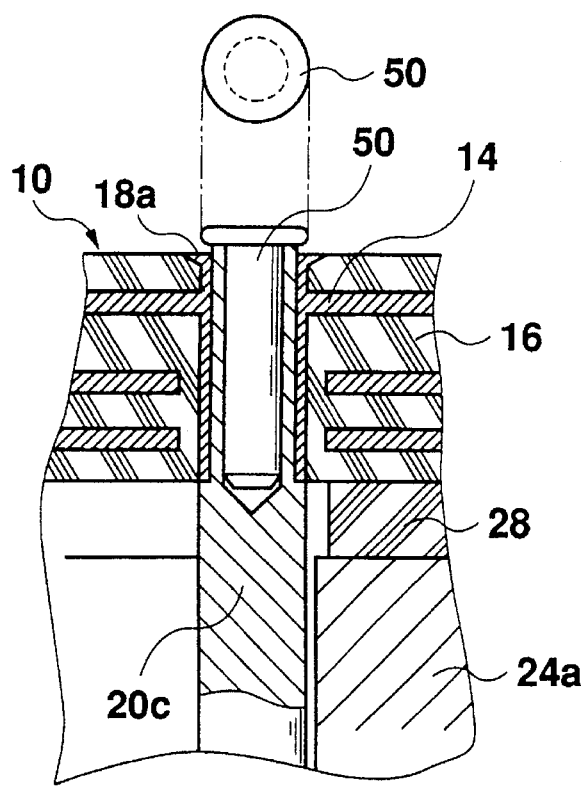
FIG. 9 shows a connecting state between the molded coil piece and a crossover coil piece according to the embodiment of the present invention.
Figure 10:
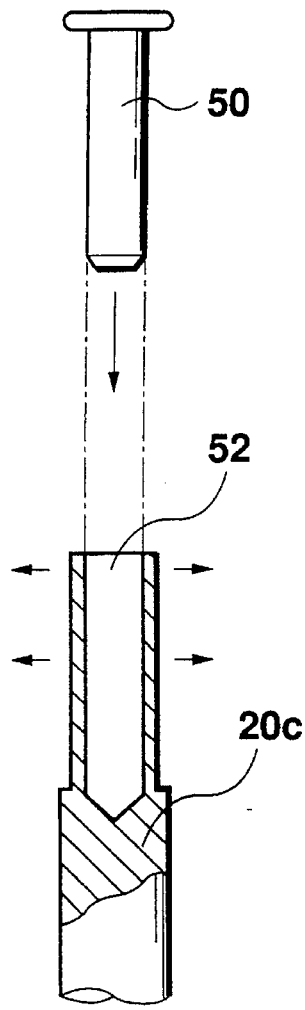
FIG. 10 is an illustrative view showing a method of connection between the molded coil piece and the crossover coil in FIG. 9.

As another example of the electrical connection between the molded coil piece and the crossover coil, a caulking member 50 can be used, as shown in FIGS. 9 and 10. In this method, the caulking member 50 is caulked to the molded coil piece 20c provided with a hollow portion 52 to enlarge the diameter of the molded coil piece 20c, whereby the molded coil piece 20c is closely contacted with the crossover coil 10 to achieve the electrical connection. As just described, the electrical connection can be achieved by simply caulking the caulking member 50, and so an assembly workability at the time of the manufacture is extremely high.

Moreover, as another connection technique, a welding process such as ultrasonic welding can also be used.

Embodiment 2

Next, another embodiment of the electric motor of the present invention will be described.

Figure 11:
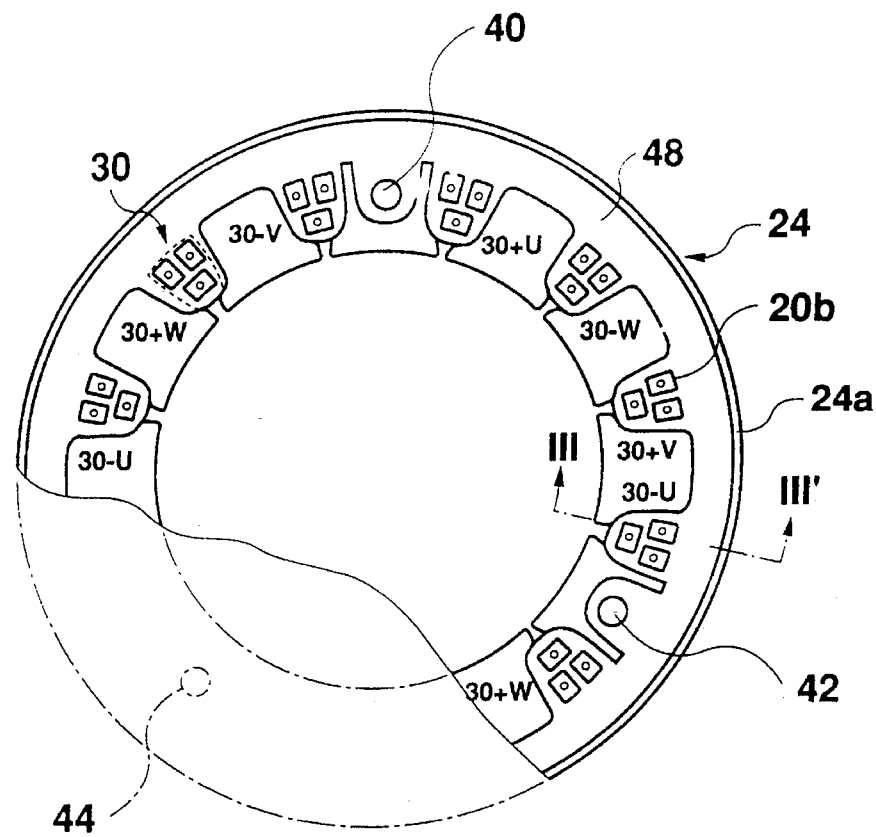
FIG. 11 shows a main portion of the electric motor according to Embodiment 2 of the present invention as seen from a rotating shaft direction.
Figure 12:
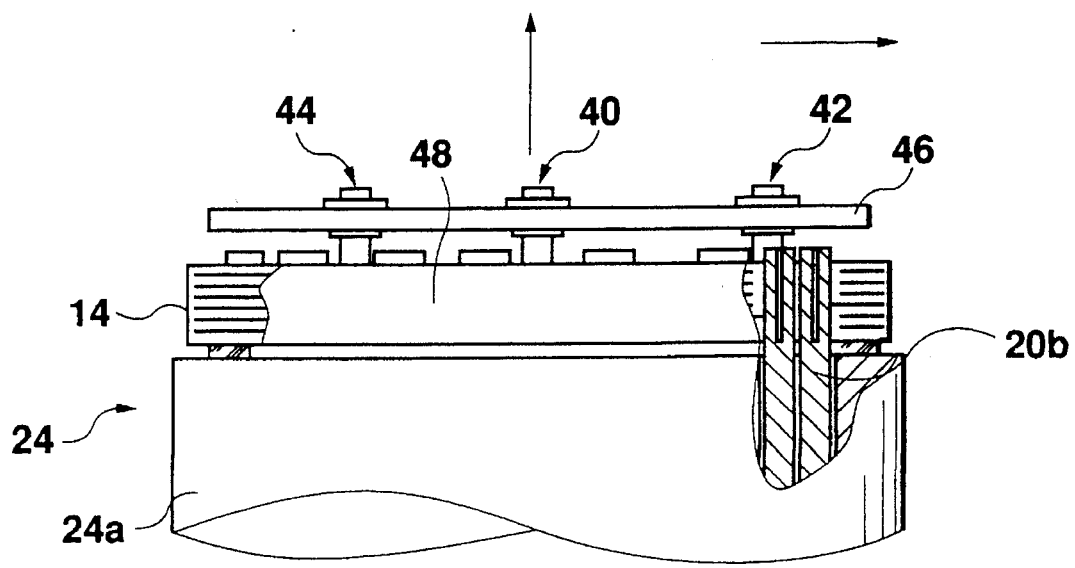
FIG. 12 is a side view of FIG. 11, and it is partially cut out along the line III–III' in FIG. 11.
Figure 13:
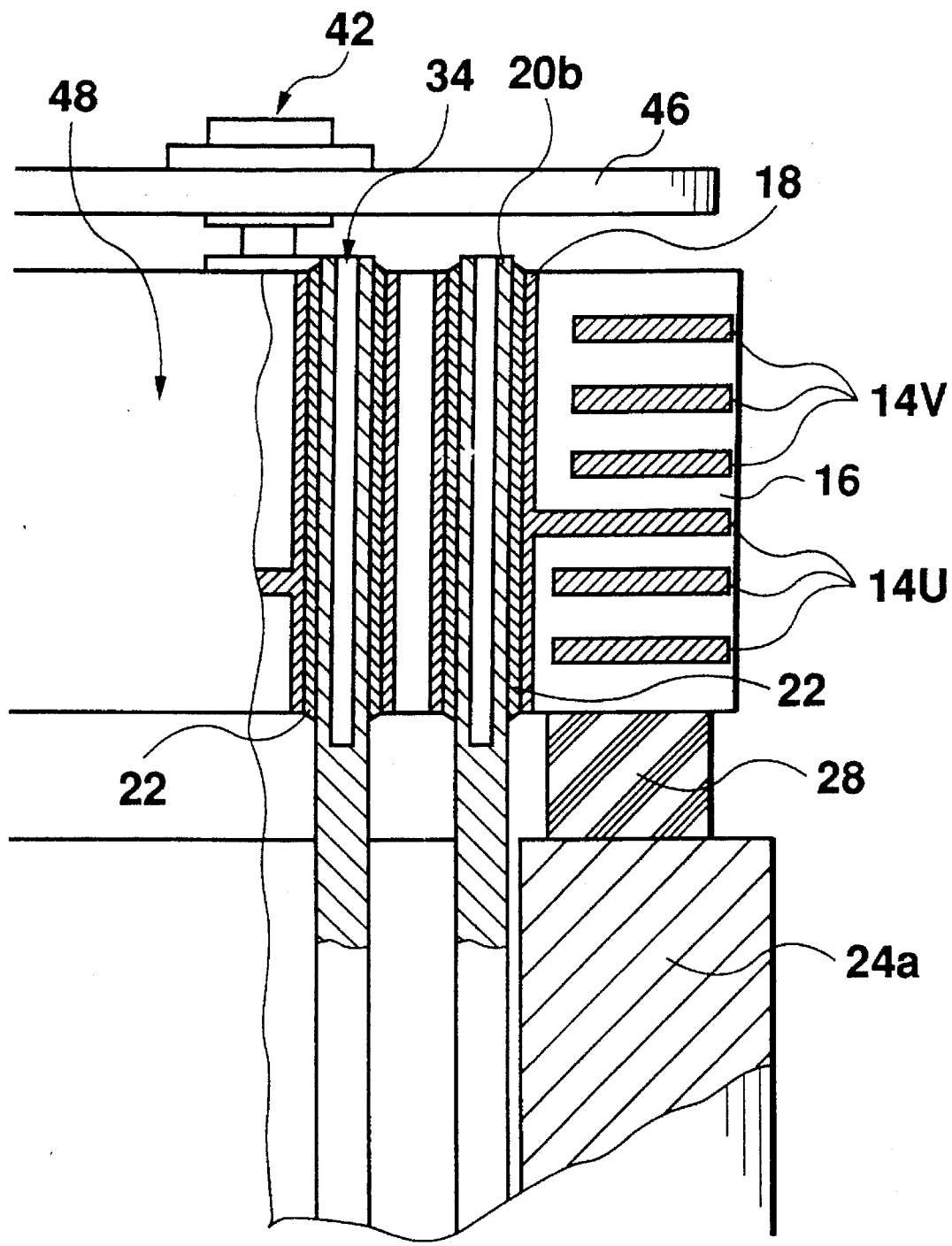
FIG. 13 is an enlarged view of a joint portion between the molded coil piece and the crossover coil on one end side of a stator core in FIG. 12.
Figure 14:
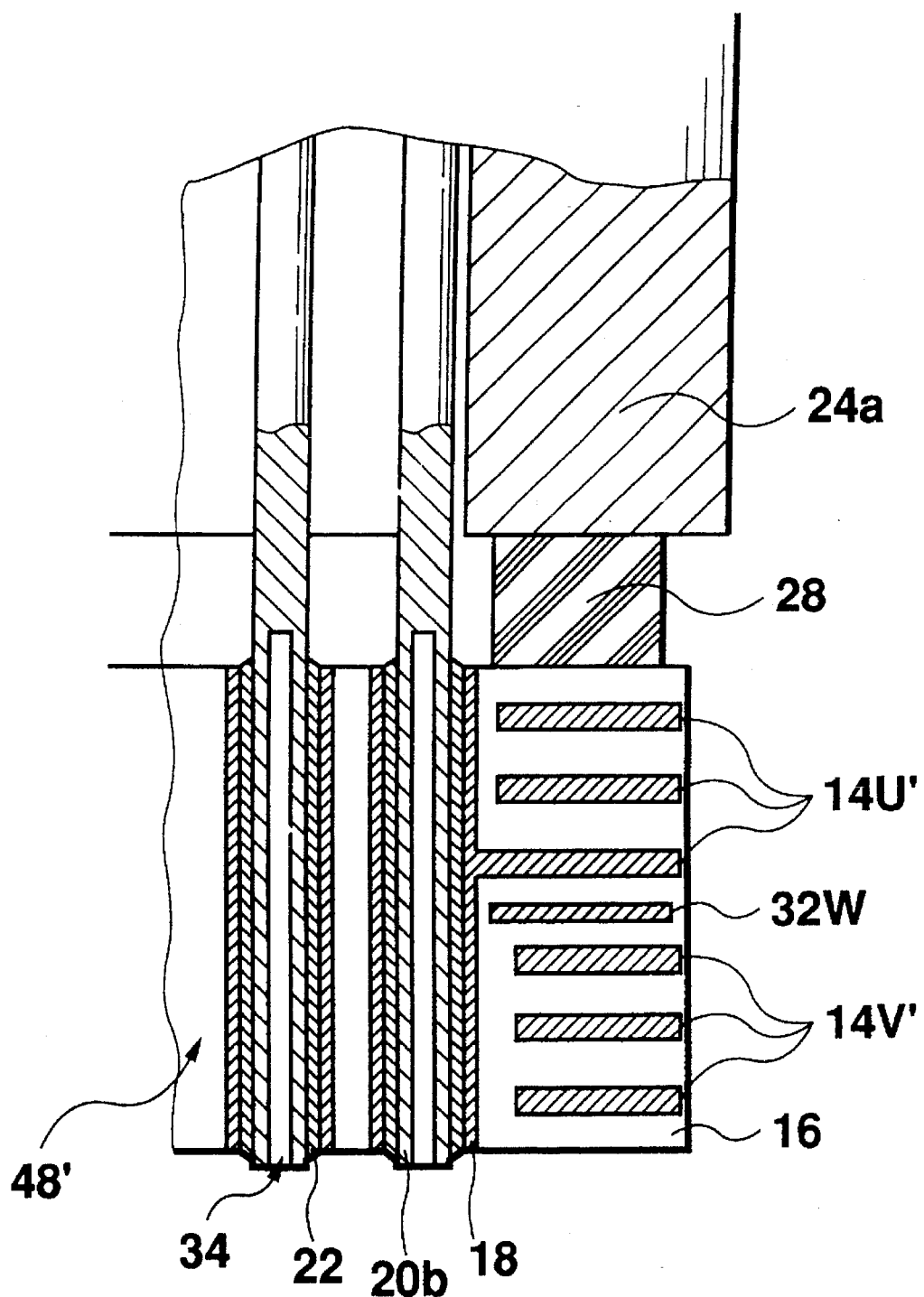
FIG. 14 is an enlarged view of a joint portion between the molded coil piece and the crossover coil on the other end side of the stator core in FIG. 12.

FIG. 11 shows a stator end portion of a three-phase driving motor according to the present invention as seen along a rotating shaft. Furthermore, FIG. 12 is a side view of FIG. 11, and it is partially cut out along the line III–III' in FIG. 11, FIG. 13 is an enlarged view of a joint portion between the molded coil piece 20b and the connecting member 48 on one end side of a stator core 24b in FIG. 12, and FIG. 14 is an enlarged view of a joint portion between the molded coil piece 20b and the connecting member 48' on the other end side of the stator core in FIG. 12. Incidentally, the same members as already described are represented by the same symbols, and their description will be omitted.

As in Example 1, the electric motor in this embodiment is also an electric motor drivable by a three-phase AC current of U-phase, V-phase and W-phase which shift from each other by as much as 120°. A laminated stator core 24a is provided with a plurality of slots 30 facing toward a rotor not shown. Into the slots 30, the molded coil pieces 20b are inserted, and on the surface of the rotor not shown which faces toward the stator core 24a, permanent magnets are mounted. In this drawing, the three molded coil pieces 20b are exemplarily inserted into one slot 30, but the number of molded coil pieces is not limited thereto. Alternatively, the molded coil pieces 20b may be formed into a plate shape and may be incorporated so as to be laminated in the radial direction of the electric motor, as shown in FIG. 2.

The feature of this embodiment is that the molded coil pieces 20b of the U-phase, V-phase and W-phase are connected to each other by one connecting member (the crossover coil) 48.

If the number of molded coil pieces 20b which are inserted into one slot 30 is L, L×2 layers of conductive members 14 are laminated via insulating layers 16 in this connecting member 48.

For example, in the case where the electric motor is a three-phase type and the three molded coil pieces 20b are inserted into the one slot 30, the above-mentioned connecting member 48 has such a constitution as shown in FIGS. 13 and 14. That is, the three molded coil pieces 20b in the U-phase slot 30 are connected to the three molded coil pieces 20b in the other U-phase slot 3, respectively, by three-layer conductive members 14U, 14U'. Furthermore, conductive members 14V, 14V' for separately connecting the molded coil pieces 20b of the V-phase not shown in the same section are also laminated and arranged in the form of three layers.

The connecting member 48 is provided with a conductive pipe 18 into which the molded coil piece 20b can be inserted at a ratio of 1:1. This conductive pipe 18 is connected to the one-layer conductive member 14U, 14U' corresponding to the molded coil piece 20b of the U-phase which is inserted into the conductive pipe 18, and the conductive member 14U, 14U' is insulated from the conductive members 14U, 14U' corresponding to the other molded coil pieces 20b and the conductive members 14V, 14V' of the V-phase.

After the molded coil piece 20b has been inserted into the conductive pipe 18, the conductive pipe 18 and the molded coil piece 20b are electrically connected to each other by forcing a soldering member 22 into a space therebetween. In this embodiment, the molded coil piece 20b having the hollow portion in one end portion is used, but the molded coil piece 20b which is molded into a hollow pipe shape may be used as shown in FIG. 7. Alternatively, the molded coil piece 20b having no hollow portion may also be used as shown in FIG. 6.

In addition, the electrical connection between the conductive pipe 18 and the molded coil piece 20b may be achieved by the use of a caulking member 50 as shown in FIG. 9, or a welding process such as ultrasonic welding can also be used.

As in the U-phase, the molded coil pieces in the slots of the V-phase and the W-phase not shown are also connected by the conductive members 14 corresponding to the connecting members 48, 48', respectively.

As described above, one coil is constituted by the molded coil pieces 20b inserted into the pair of slots 30 of the same phase (slots 30+U, 30–U in the case of the U-phase, slots 30+V, 30–V in the case of the V-phase, and slots 30+W, 30–W in the case of the W-phase), and the connecting members 48, 48' having the conductive members for connecting these molded coil pieces 20.

The connecting member 48' shown in FIG. 14 is provided with a conductive member 32W for connecting two coils of the W-phase, in addition to the conductive members 14U, 14U'. Although not shown, a plurality of coils of the U-phase and the V-phase are also connected in a similar manner.

Reference numeral 46 shown in FIGS. 12 and 13 is a neutral point connection ring for star (Y)-connecting the three-phase coil, and reference numerals 40, 42 and 44 are connection points to the respective phases. This neutral point connection ring 46 is applicable to the constitution of Embodiment 1.

The employment of the connecting members having the above-mentioned structure permits the manufacture of the electric motor having the conductive members with a high dimensional accuracy and having extremely high characteristics in less steps. The amount of a material for the coil can be decreased and the coil end can be simultaneously miniaturized, so that the miniaturization and weight reduction of the electric motor can be realized.

In Embodiments 1 and 2, the three-phase four-pole electric motors have been described, but the constitution of the present invention has the above-mentioned effects also in motors other than this type of motors.

As described above, according to the present invention, an electric motor having a high coil space factor in each slot can be provided. In addition, the protrusion of a coil end from the slot can be reduced, which permits the shortening of the motor in its lengthwise direction and the weight reduction of the motor.

Furthermore, the dimensional accuracy of connecting members and the insulating reliability of crossover portions between slots can be improved by a simple constitution and manufacturing process, whereby the characteristics of the electric motor can be improved.

What is claimed is:

1. A multi-phase driving electric motor having a stator and a rotor arranged so as to confront the stator, said stator comprising:
    (a) a stator core provided with a plurality of slots facing toward the rotor in a direction parallel with a rotating shaft of the rotor, and
    (b) a coil having:
        (b-1) a plurality of molded coil pieces inserted in to each slot, and
        (b-2) a plurality of connecting members connecting the molded coil pieces in the slot to the molded coil pieces in another slot having the same phase as the former coil pieces, said connecting members being arranged on two edges of the stator in the direction parallel with rotating shaft of the rotor, and having an integral structure of plurality of conductive members laminated via insulating layers and said conductive members and insulating layers being perpendicular to the rotating shaft and layered in the direction of the rotating shaft.

2. A multi-phase driving electric motor having a stator and a rotor arranged so as to confront the stator, said stator comprising:
    (a) a stator core provided with a plurality of slots facing toward the rotor in a direction parallel with a rotating shaft of the rotor, and
    (b) a coil having:
        (b-1) a plurality of molded coil pieces inserted in each slot, and
        (b-2) a plurality of connecting members connecting the molded coil pieces in the slot to the molded coil pieces in another slot having the same phase as the former coil pieces, said connecting members being arranged on two edges of the stator in the direction parallel with rotating shaft of the rotor, and having a plurality of conductive members laminated via insulating layers in the direction perpendicular to the rotating shaft, wherein said connecting members have a plurality of conductive pipes, the end portion of one molded coil piece can be inserted into each conductive pipe, and the inserted molded coil piece is electrically connected to the conductive member corresponding to the molded coil piece but insulated from the conductive member corresponding to the other molded coil piece.

3. The electric motor of claim 2 wherein at least the end section of the molded coil piece which is inserted into the conductive pipe is hollow.

4. The electric motor of claim 3 wherein at least the end section of the molded coil piece which is inserted into the conductive pipe is hollow.

5. The electric motor of claim 2 wherein at least the end section of the molded coil piece which is inserted into the conductive pipe is hollow, and a caulking member is inserted into the hollow end section to electrically connect the molded coil piece to the conductive pipe.

6. The electric motor of claim 2 wherein the connecting members electrically connect the molded coil pieces of the same phase to each other and have an outer connecting member arranged on the outer periphery side in the radial direction of the motor and an inner connecting member arranged on the inner periphery side in the radial direction of the motor, and the inner connecting member and the outer connecting member are arranged at mutually different heights on the edge of the stator in a direction parallel with the rotating shaft of the rotor.

7. The electric motor of claim 6 wherein if a value of N×M/2 is an even number, where N is an integer number of motor phases and M is an integer number of motor poles, the number of the outer connecting members is equal to that of the inner connecting members.

8. The electric motor of claim 6 wherein the molded coil piece is electrically connected to the conductive pipe into the molded coil piece is inserted, by soldering or welding.

9. The electric motor of claim 8 wherein at least the end section of the molded coil piece which is inserted into the conductive pipe is hollow.

10. The electric motor of claim 6 wherein at least the end section of the molded coil piece which is inserted into the conductive pipe is hollow, and a caulking member is inserted into the hollow end section to electrically connect the molded coil piece to the conductive pipe.

11. The electric motor of claim 2 wherein the connecting member arranged on one edge side of two edges of the stator has L×2 conductive members, where L is an integer number of molded coil pieces into each slot, and the connecting member arranged on the other edge side has L×2+1 conductive members laminated, and the molded coil pieces constituting the coil of each phase are electrically connected by these conductive members.

* * * * *

UNITED STATES PATENT AND TRADEMARK OFFICE
CERTIFICATE OF CORRECTION

PATENT NO. : 5,623,178
DATED : 22 April 1997
INVENTOR(S) : Yasutomo KAWABATA et al.

It is certified that error appears in the above-indentified patent and that said Letters Patent is hereby corrected as shown below:

| Column | Line | |
|--------|------|---|
| 6 | 20 | Change "oil" to --coil--. |
| 9 | 37 | Change "in to" to --into--. |
| 10 | 43 | Change "into the" to --into which the--. |

Signed and Sealed this

Eighteenth Day of November 1997

Attest:

BRUCE LEHMAN

Attesting Officer           Commissioner of Patents and Trademarks